United States Patent
Chillar et al.

(10) Patent No.: US 7,648,564 B2
(45) Date of Patent: Jan. 19, 2010

(54) AIR BYPASS SYSTEM FOR GAS TURBINE INLET

(75) Inventors: Rahul J. Chillar, Greenville, SC (US); Raub Warfield Smith, Ballston Lake, NY (US); Alston Ilford Scipio, Mabelton, GA (US)

(73) Assignee: General Electric Company, Schenectady, NY (US)

( * ) Notice: Subject to any disclaimer, the term of this patent is extended or adjusted under 35 U.S.C. 154(b) by 535 days.

(21) Appl. No.: 11/425,520

(22) Filed: Jun. 21, 2006

(65) Prior Publication Data

US 2007/0294984 A1 Dec. 27, 2007

(51) Int. Cl.
*B01D 46/00* (2006.01)
(52) U.S. Cl. ............... 95/273; 55/312; 55/314; 60/599; 60/772; 60/728; 60/248; 60/262; 60/287
(58) Field of Classification Search ............... 55/429, 55/428, 430, 432, 466, 309, 312, 313, 314; 95/273; 60/39.182, 39.5, 599, 772, 728, 60/694, 248, 262, 287; 220/745, 810, 811, 220/913; 165/100, 103, DIG. 109; 137/875
See application file for complete search history.

(56) References Cited

U.S. PATENT DOCUMENTS

| | | | |
|---|---|---|---|
| 4,416,111 A * | 11/1983 | Lenahan et al. ............... 60/795 |
| 4,748,805 A * | 6/1988 | Rigault et al. ................. 60/39.5 |
| 5,002,121 A * | 3/1991 | von Erichsen .............. 165/100 |
| 5,279,358 A * | 1/1994 | Hannis ........................ 165/103 |
| 5,553,555 A * | 9/1996 | Gosselin et al. .............. 110/215 |
| 6,748,734 B1 * | 6/2004 | Coleman et al. ......... 60/39.182 |
| 7,007,484 B2 * | 3/2006 | Stegmaier et al. ............. 60/772 |
| 7,297,173 B2 * | 11/2007 | Renwart et al. ................ 55/429 |
| 7,442,239 B2 * | 10/2008 | Armstrong et al. ............ 96/155 |
| 2005/0056023 A1 | 3/2005 | Pierson |
| 2005/0188673 A1 * | 9/2005 | Nishimura et al. ........... 60/39.5 |
| 2007/0089412 A1 * | 4/2007 | Sommerhoff ................. 60/599 |

FOREIGN PATENT DOCUMENTS

EP 1484489 A2 5/2004

OTHER PUBLICATIONS

Title: "Design Guide: Combustion Turbine Inlet Air Cooling Systems", Author: William E. Stewart, Jr.; Date: 1999; pp. 1-91.

* cited by examiner

*Primary Examiner*—Duane Smith
*Assistant Examiner*—Minh-Chau T Pham
(74) *Attorney, Agent, or Firm*—Sutherland Asbill and Brennan LLP

(57) ABSTRACT

An air bypass system for a gas turbine inlet filter house having a power augmentation system. The air bypass system may include a duct positioned on the inlet filter house about the power augmentation system and a damper positioned within the duct so as to open and close the duct.

18 Claims, 5 Drawing Sheets

AIR BYPASS SYSTEM FOR GAS TURBINE INLET

TECHNICAL FIELD

The present application relates generally to gas turbines and more particularly relates to an air bypass system for a reduced pressure drop in a gas turbine in let.

BACKGROUND OF THE INVENTION

Generally described, gas turbine engines include a compressor for compressing incoming air, a combustor for mixing fuel with the compressed air and to ignite the fuel and the air to form a high temperature gas stream, and a turbine that is driven by the high temperature gas stream. Other components also may be used herein. The power of the gas turbine engine is related generally to the temperature of the gas flow at various locations therethrough. Specifically, the temperature at the compressor inlet, the compression ratio, and the temperature of the combustor outlet are closely monitored during operation of the engine. Lowering the temperature of the gas flow entering the compressor generally results in increasing the output of the engine.

Known methods of reducing the temperature include the use of a power augmentation system. A power augmentation system may include a chiller coil and evaporator coolers so as to reduce the temperature of the gas stream. Known power augmentation systems are shown in, for example, U.S. Pat. No. 7,007,484 B2 and U.S. Patent Publication No. 2005/0056023 A1.

The use of a power augmentation system, however, adds resistance to the airflow entering the compressor. This resistance is defined as a pressure drop in the inlet system and may be measured in inches of water column. Turbine efficiency and power output are a direct function of the inlet system pressure drop. The higher the inlet system pressure drop, the lower the efficiency and power output of the turbine.

The power augmentation system increases the gas turbine output and efficiency when operating at the desired ambient conditions. When the power augmentation system is not operating, however, the additional pressure drop that the system adds in the air inlet stream reduces the gas turbine efficiency and output. Typical pressure drop values across the gas turbine inlet system for power generation varies from about two (2) to about five (5) inches of water column (about five (5) to about 12.7 centimeters of water). This includes the pressure drop across the power augmentation system, which varies from about 0.5 inches to about 1.5 inches of water column (about 1.27 to about 3.8 centimeters of water). Depending on the size of the gas turbine frame, the value of this pressure drop affects the gas turbine output anywhere in the range of about one (1) to about five (5) megawatts at rated ISO conditions. This in turn may affect the turbine efficiency in the range of about 0.01% to about 0.3%. Every point of efficiency and power, however, is essential in the competitive business of power generation or the variety of other uses for mechanical drive gas turbines.

There is a desire, therefore, for an air bypass system for a gas turbine inlet that reduces the pressure drop therethrough while the power augmentation systems are not operating. Such an air bypass system should increase the overall efficiency and power of the gas turbine engine.

SUMMARY OF THE INVENTION

The present application thus provides an air bypass system for a gas turbine inlet filter house having a power augmentation system. The air bypass system may include a duct positioned on the inlet filter house about the power augmentation system and a damper positioned within the duct so as to open and close the duct.

The air bypass system further may include a number of ducts. The ducts may include a pair of side ducts and a top duct. The duct may include a polymer. The damper may include a damper door or an air bladder. The damper may be shut when the power augmentation system is operating. The duct bypasses the power augmentation system.

The present application further describes a gas turbine inlet filter house. The filter house may include a power augmentation system and an air bypass system positioned about the power augmentation system.

The air bypass system may include a damper door positioned about the power augmentation system. The air bypass system also may include a duct positioned about the power augmentation system. The air bypass system may include a damper positioned within the duct. A number of ducts may be used. The ducts may include a pair of side ducts and a top duct. The duct may include a polymer or a variety of different materials.

The present application further describes a method of improving the efficiency of a gas turbine engine having an inlet filter house with a power augmentation system therein. The method may include increasing the airflow area about the power augmentation system when augmentation is not needed, engaging the power augmentation system to produce additional power, and confining the airflow to pass through the power augmentation system when the power augmentation system is operational.

These and other features of the present application will become apparent to one of ordinary skill in the art upon review of the following detailed description of the several embodiments when taken in conjunction with the drawings and the appended claims.

DETAILED DESCRIPTION

Figure 1A:
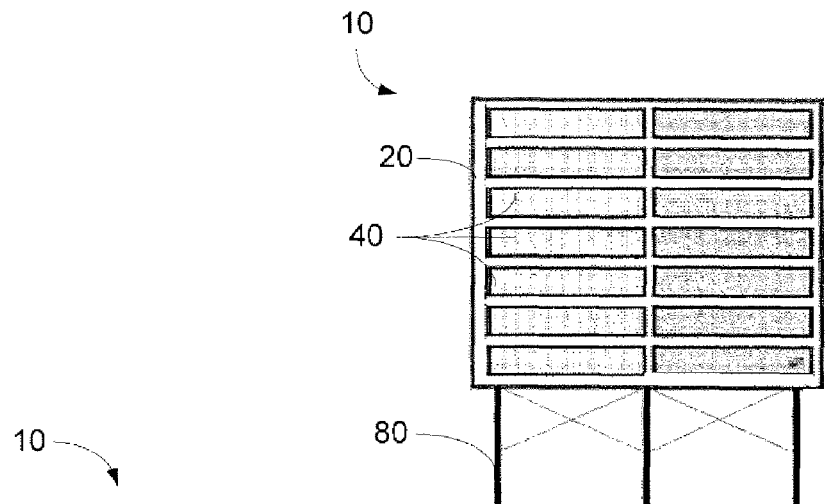
FIG. 1A is a front plan view of a known inlet filter house.
Figure 1B:
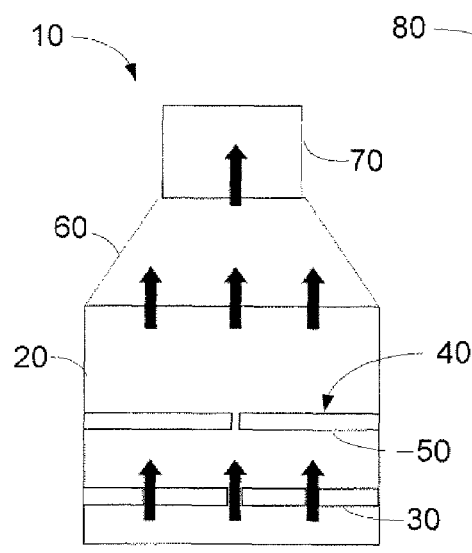
FIG. 1B is a top plan view of the known inlet filter house of FIG. 1A.
Figure 1C:
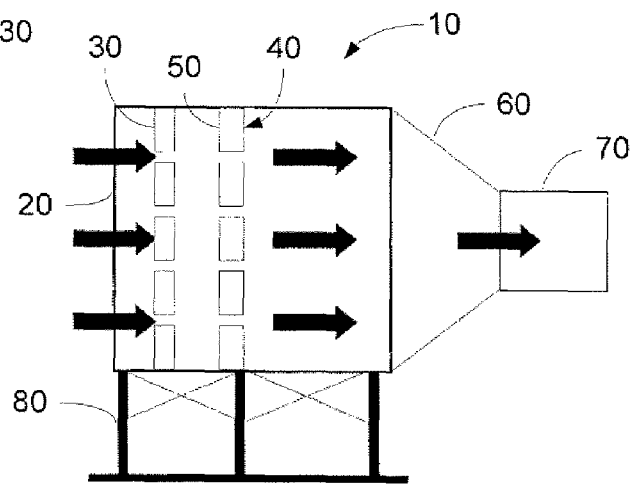
FIG. 1C is a side view of the known inlet filter house of FIG. 1A.

Referring now to the drawings, in which like numerals refer to like elements throughout the several views, FIGS.

1A-1C show a known inlet filter house 10. The inlet filter house 10 may be used with a gas turbine engine as is described above. The inlet filter house 10 includes a filter house envelope 20. The filter house envelope 20 is typically a box like structure with a number of filters 30 positioned therein. The filters 30 may be conventional filter devices so as to limit the intake of dust and debris into the gas turbine engine as a whole. Positioned within the filter house envelope 20 may be a power augmentation system 40. The power augmentation system 40 may include a chiller coil 50 or other types of chilling devices such as those described above. Positioned adjacent to the filter house envelope 20 may be a transition section 60. The transition section 60 narrows the airflow path so as to increase the airflow velocity. The transition section 60 may lead to an inlet duct 70. The inlet duct 70 leads to the gas turbine components as are described above. The inlet filter house 10 also may include a support 80 or other type of positioning device. The inlet filter house 10 may have other or additional components as may be desired.

Figure 2A:
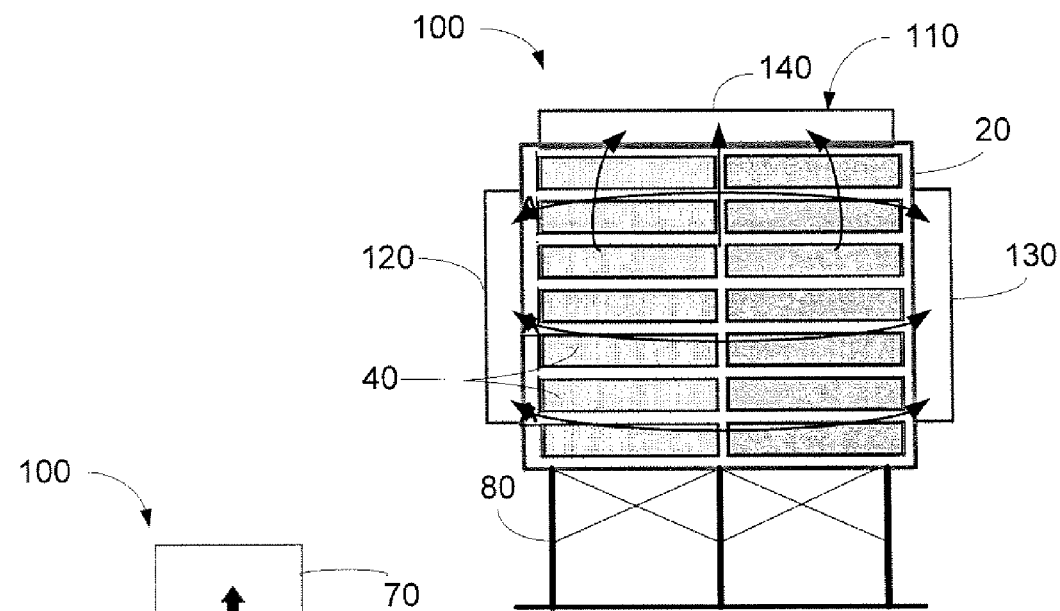
FIG. 2A is a front plan view of an inlet filter house with the air bypass system as is described herein.
Figure 2B:
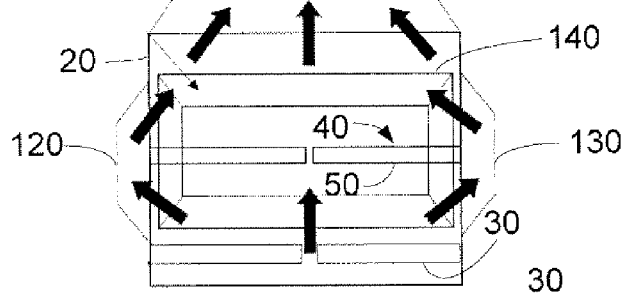
FIG. 2B is a top plan view of the inlet filter house with the air bypass system of FIG. 2A.
Figure 2C:
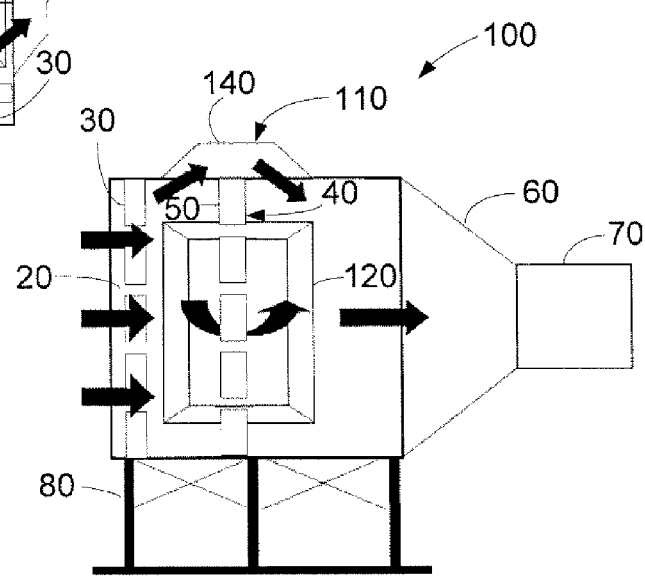
FIG. 2C is a side plan view of an inlet filter house with the air bypass system of FIG. 2A.

FIGS. 2A-2C show an inlet filter house 100 as is described herein. The inlet filter house 100 may include the components described above with respect to the inlet filter house 10 and/or similar components. The inlet filter house 100 also includes an air bypass system 110. The air bypass system 110 includes a number of bypass ducts. In this case, a pair of side ducts, a first side duct 120 and a second side duct 130, and a top duct 140. The ducts 120, 130, 140 may be positioned about the chiller coil 50. Not all of the ducts 120, 130, 140 may be used. Other and further configurations of the ducts 120, 130, 140 also may be used herein. The arrows show the flow of air through the several ducts 120, 130, 140. The ducts 120, 130, 140 may be made out of polymers or other lightweight types of materials. The ducts 120, 130, 140 generally do not have any type of structural role. Metals and other types of standard structural materials, however, also may be used. The ducts 120, 130, 140 also may be in the form of an air bladder. The air bladder could deflate and inflate so as to create the airflow path therethrough.

Figure 3:
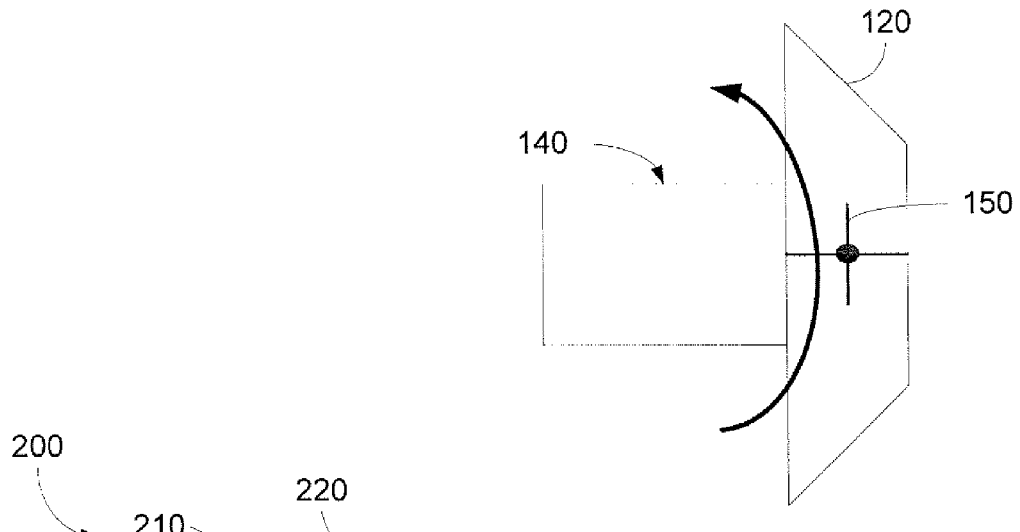
FIG. 3 is an expanded view of an air bypass duct of FIGS. 2A-C illustrating the air dampers.

FIG. 3 shows the air bypass system 110 with a damper door 150 positioned therein. The damper doors 150 may be controlled manually or automatically. Any number of damper doors 150 may be used herein. Alternatively, the air bladders could inflate and deflate within or in place of the ducts 120, 130, 140 and control the airflow path therethrough without the use of the doors 150.

Figure 4A:
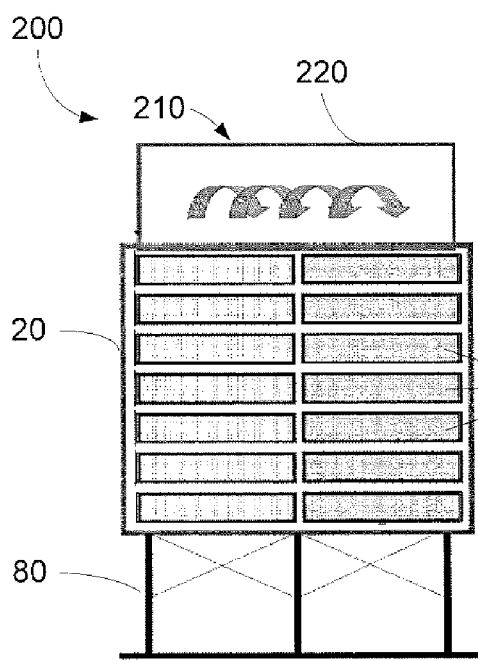
FIG. 4A is a front plan view of an inlet filter house with an alternative embodiment of the air bypass system.
Figure 4B:
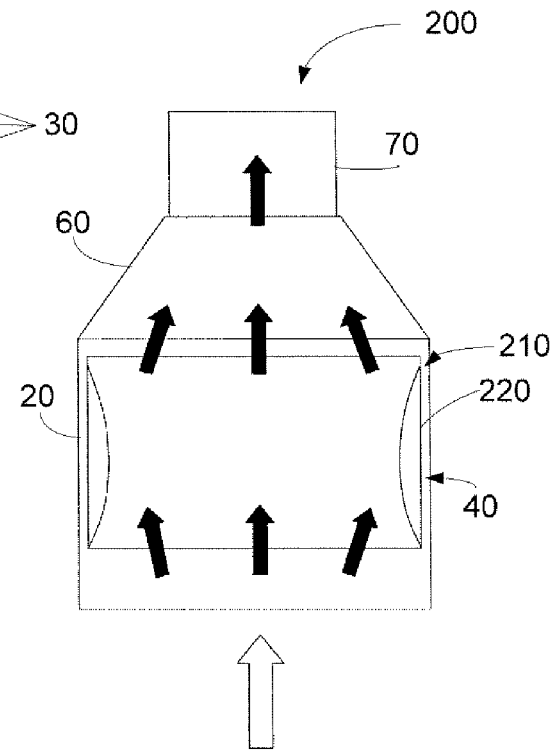
FIG. 4B is a top plan view of the inlet filter house with the alternative embodiment of the air bypass system of FIG. 4A.
Figure 4C:
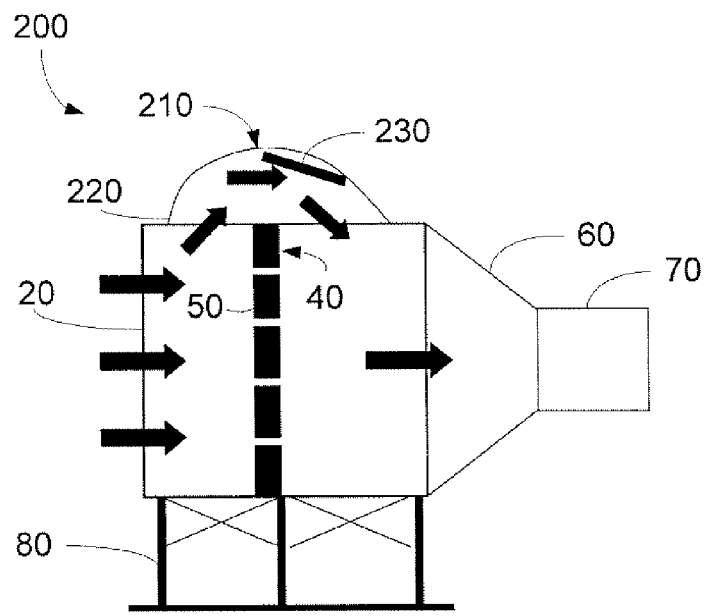
FIG. 4C is a side plan view of the inlet filter house with the alternative embodiment of the air bypass system of FIG. 4A.

FIGS. 4A-4C show a further embodiment of an inlet filter house 200. As above, the inlet filter house 200 may include the components of the inlet house 10 and/or similar components. The inlet filter house 200 also includes an air bypass system 210. In this system 210, only one duct is used, an upper duct 220. The upper duct 220 may be positioned about the chiller 50. Likewise, the upper duct 220 may include a damper 230 positioned therein so as to open and close the duct 220 as may be desired. The configuration of the air bypass system 210 has the advantage of avoiding possible interference with the piping related to the power augmentation system 40. Similar configurations may be used herein.

In use, the air bypass systems 110, 210 generally will only be used when the power augmentation system 40 is not operating. As such, the air bypass systems 110, 210 would be closed by the damper doors 150, 230 or by other means during operation of the power augmentation system 40. When the power augmentation system 40 is not operational, the air bypass systems 110, 210 thus route the incoming air through some or all of the ducts 120, 130, 140 so as to add flow area around the power augmentation system 40 and avoid the resistance therethrough.

The use of the air bypass systems 110, 210 thus minimizes the air inlet system resistance by providing an additional flow path around the power augmentation system 40. The pressure drop varies as the square of the gas velocity, so even a modest increase in the available flow area (and hence reduction in air velocity) offers a reduction in the pressure drop. The use of the air bypass systems 110, 120 thus will lower the inlet pressure drop and increase the turbine output and performance. The use of the air bypass systems 110, 210 also improves the overall economics of the power augmentation system 40 because the designed pressure drop through the power augmentation system 40 is no longer a compromise between the cost of the heat exchanger and a performance penalty paid when it is not in use. The power augmentation system 40 thus can be designed for a lower cost and a higher pressure drop while in service because an independent means is available to reduce the operating inlet pressure drop when augmentation is not needed.

Figure 5A:
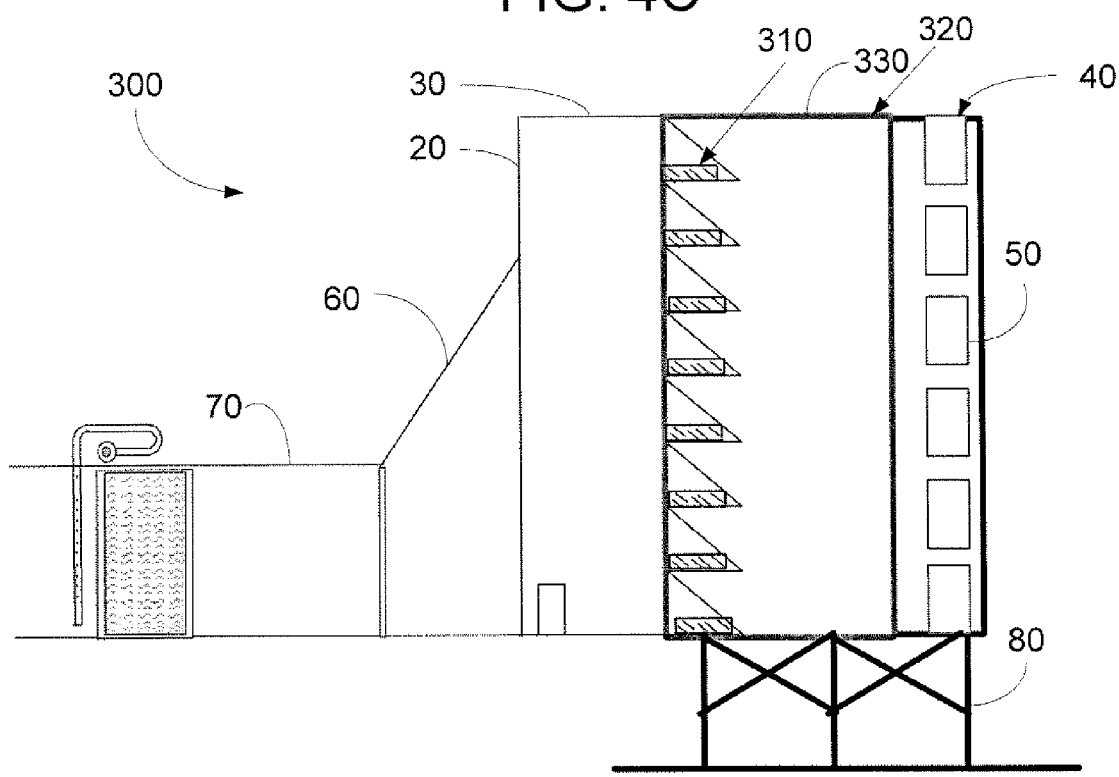
FIG. 5A is a front plan view of an inlet filter house with an alternative embodiment of the air bypass system.
Figure 5B:
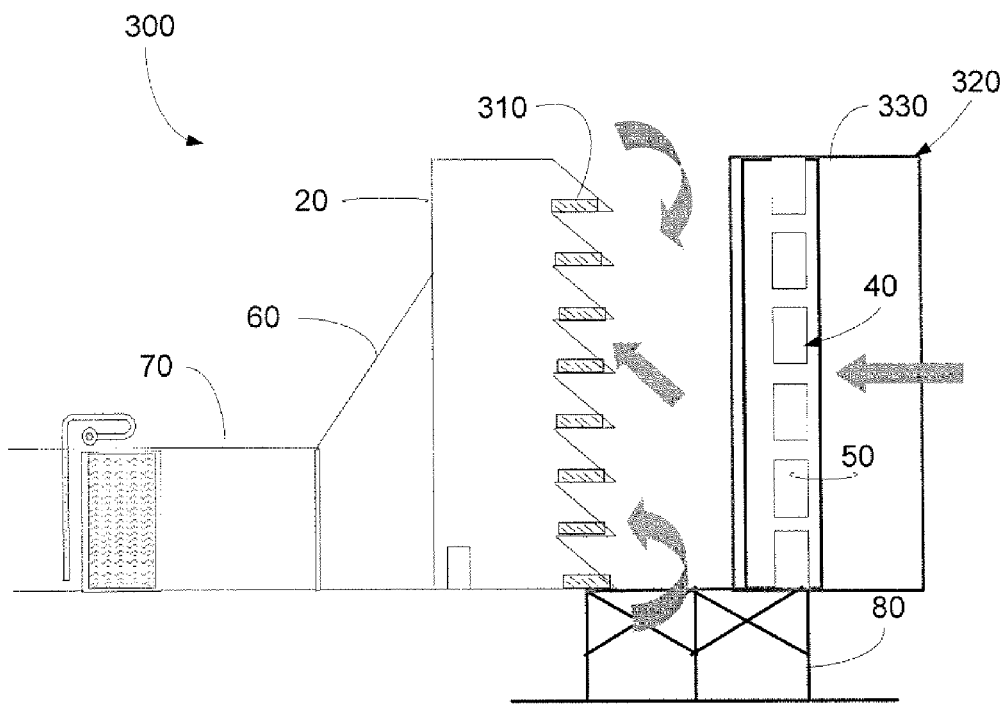
FIG. 5B is a side plan view of the inlet filter house with the alternative embodiment of the air bypass system of FIG. 5A.

FIGS. 5A and 5B show a further embodiment of an inlet filter house 300. In this embodiment, the chiller coil 50 may be moved to the front of the filter house envelope 20. The filters 30 themselves would be positioned behind the chiller coil 50. A drift eliminator and/or coalescer pad 310 also may be used herein. The inlet filter house 300 also includes an air bypass system 320. The air bypass system 320 includes a pair of damper doors 330 positioned between the chiller coil 50 and the filters 30. When the chiller coil 50 is not in use, the damper doors 330 may be opened so as to permit airflow directly into the filters 30. The use of the air bypass system 320 thus enables a reduction in the pressure drop when the chiller coil 50 is positioned in front of the filters 30 and not operating. The air bypass system 320 also may use hinged damper doors 330 or even the air bladders.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. An air bypass system for a gas turbine, comprising:
   an inlet filter house;
   a power augmentation system positioned within the inlet filter house;
   wherein the power augmentation system comprises a chiller or an evaporative cooler;
   a duct positioned on the inlet filter house about the power augmentation system; and
   a damper positioned within the duct so as to open and close the duct.

2. The air bypass system of claim 1, further comprising a plurality of ducts.

3. The air bypass system of claim 2, wherein the plurality of ducts comprises a pair of side ducts.

4. The air bypass system of claim 1, wherein the duct comprises a top duct.

5. The air bypass system of claim 1, wherein the duct comprises a polymer.

6. The air bypass system of claim 1, wherein the damper comprises a damper door.

7. The air bypass system of claim 1, wherein the damper comprises an air bladder.

8. The air bypass system of claim 1, wherein the damper is shut when the power augmentation system is operating.

9. The air bypass system of claim 1, wherein the duct bypasses the power augmentation system.

10. A gas turbine, comprising:
an inlet filter house;
a power augmentation system positioned within the inlet filter house;
wherein the power augmentation system comprises a chiller or an evaporative cooler; and
an air bypass system positioned about the power augmentation system.

11. The gas turbine of claim 10, wherein the air bypass system comprises a damper door positioned about the power augmentation system.

12. The gas turbine of claim 10, wherein the air bypass system comprises a duct positioned about the power augmentation system.

13. The gas turbine of claim 12, wherein the air bypass system comprises a damper positioned within the duct.

14. The gas turbine of claim 12, wherein the air bypass system comprises a plurality of ducts.

15. The gas turbine of claim 14, wherein the plurality of ducts comprises a pair of side ducts.

16. The gas turbine of claim 12, wherein the duct comprises a top duct.

17. The gas turbine of claim 12, wherein the duet comprises a polymer.

18. A method of improving the efficiency of a gas turbine engine having an inlet filter house with a power augmentation system therein, comprising:
flowing air into the inlet filter house;
increasing an airflow area about the power augmentation system;
engaging a chiller or an evaporative cooler of the power augmentation system; and
confining the airflow to pass through the power augmentation system when the power augmentation system is operational.

* * * * *